May 11, 1965
A. BELL
3,183,168
NUCLEAR REACTOR
Filed Jan. 31, 1962
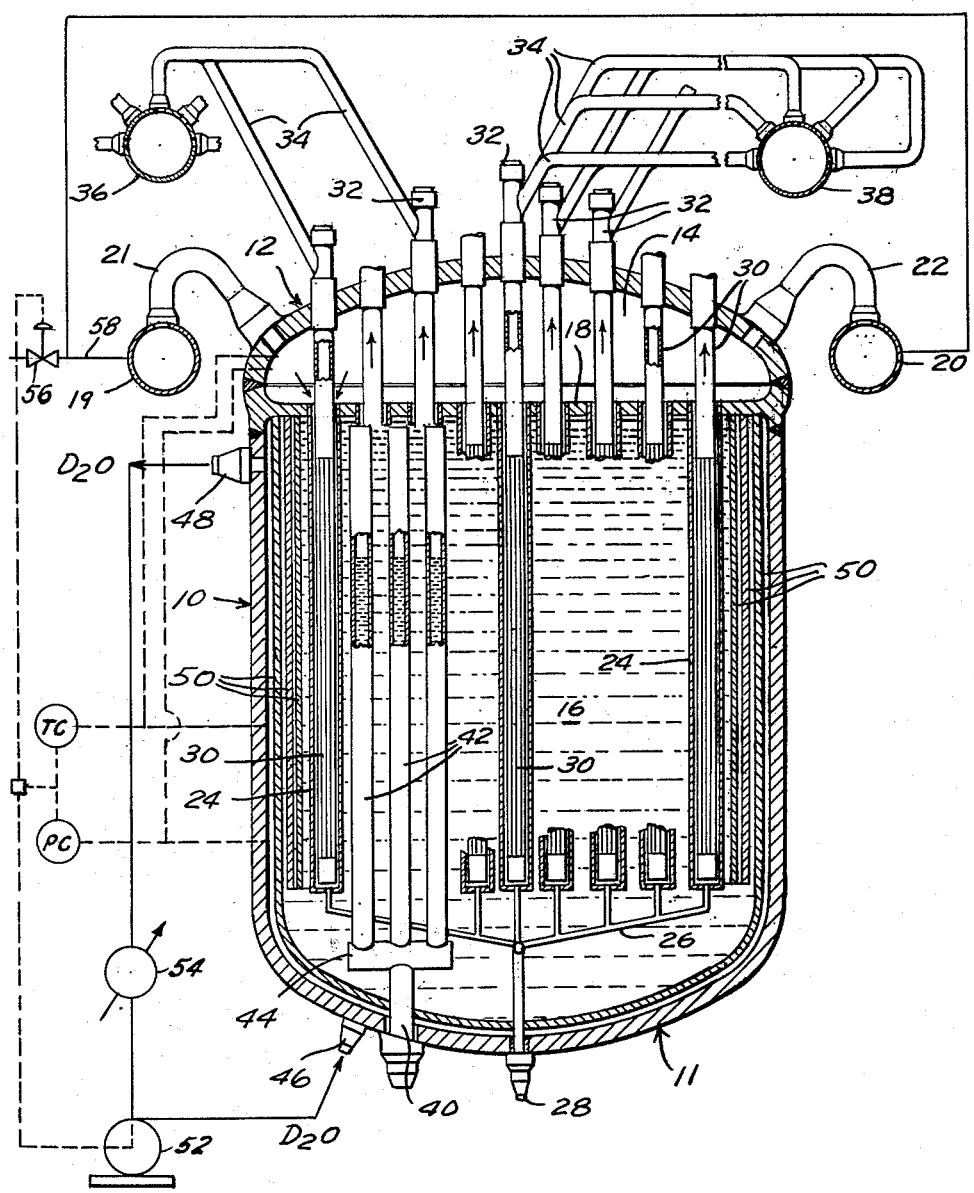
INVENTOR
BY
Richard H. Thomas
ATTORNEY

3,183,168
NUCLEAR REACTOR

Alan Bell, Cookham, Berks, England, assignor to Foster Wheeler Corporation, New York, N.Y., a corporation of New York
Filed Jan. 31, 1962, Ser. No. 170,017
1 Claim. (Cl. 176—59)

The invention relates to a heavy or light steam cooled, heavy or light water moderated, heterogeneous, nuclear power reactor and to a method of deriving thermal power from such a reactor.

In a reactor in accordance with the invention the fuel elements are disposed within tubes located within a body of water moderator and provision is made for passing saturated cooling steam along the tubes and over the fuel elements to withdraw heat therefrom.

The moderator and the fuel/coolant tube pairs are enclosed in a pressure vessel and the moderator is maintained at a pressure and temperature substantially equal to that of the saturated cooling steam at the inlet.

In a method of deriving thermal power from a nuclear reactor in accordance with the invention, saturated steam is passed over fuel elements to be heated thereby and in which the fuel elements are surrounded by a water moderator maintained at a pressure and temperature substantially equal to that of the saturated steam.

In a typical arrangement of a reactor in accordance with the invention, the moderator and the tubes are disposed within an upright cylindrical pressure vessel having a plenum chamber for inlet steam at its upper end. The fuel element tubes form the inner tubes of coaxial tube pairs and the outer tubes of the pairs are carried on and depend from a horizontal tube sheet by which the plenum chamber is separated from the main chamber of the vessel, and receive steam from the plenum chamber. The inner tubes of the pairs pass though the plenum chamber and out through the upper end of the pressure vessel.

Control will usually be effected by regulation of the level of part of the moderator in an array of vertical control tubes within the body of moderator in the main chamber of the vessel, although in a land reactor control can be more simply by variation of the level of the entire moderator.

Such an arrangement enjoys a number of advantages over others which have been used and considered. In the first place the substantial equality of pressure between coolant and moderator enables thin-walled tubes to be used with consequent reduction in neutron absorption by the tube material. The approximately uniform temperature throughout the pressure vessel minimizes heat transfer to the moderator water and substantially reduces the problems of thermal expansion, which are further reduced by the fact that each tube is fixed at one end only. Furthermore the inner tubes which carry the fuel elements or the fuel elements themselves can be withdrawn without disturbing the structure of the containing vessel.

There is the further advantage, particularly where the reactor is intended for marine use where access is often a problem, that all the steam connections can be at one end of the reactor and that other connections such as those to the control tubes and fuel channel drains can be made elsewhere.

In order that the invention may be thoroughly understood a reactor in accordance with it, will be described in some detail, by way of example, and two modifications will be discussed, with reference to the accompanying drawing in which the reactor is shown in elevation and in section with parts cut away for clarity.

The reactor to be described is a steam cooled heavy water moderated pressure vessel type of unit. The fuel elements are contained in an array of vertical tubes in the main chamber of the vessel, surrounded by the moderator.

It is intended for use in a primary steam circuit in which cooling steam is supplied to the inlet of the reactor at a pressure of 660 pounds per square inch from a steam circulator (not shown) and at the saturation temperature of 500° F. Steam leaving the reactor at 970° F. is used to generate steam in a secondary circuit (also not shown) by indirect heat exchange.

The heavy water moderator is maintained in the space within the vessel around the coolant and fuel tubes at the same pressure as the inlet steam.

All the steam connections and refuelling ports are at the top of the vessel.

Control of the reaction rate and thermal output is effected by varying the level of moderator in an array of vertical control tubes by supplying or withdrawing the moderator through connections in the bottom of the vessel.

The reactor shown in the drawing comprises an upright cylindrical pressure vessel 10 some eighteen (18) feet high with a diameter of about twelve (12) feet and an average wall thickness of about three (3) inches.

The ends 11 and 12 of the vessel are dished and a plenum chamber 14 is formed in the upper end 12, being divided from a main chamber 16 of the vessel by a horizontal tube sheet 18. As the reactor is designed to operate with the moderator below the tube sheet 18 in the main chamber 16 at substantially the same pressure as cooling steam in the plenum chamber 14 above it, the sheet 18 need only be about two (2) or three (3) inches thick.

Cooling steam is supplied to the plenum chamber 14 from a pair of straight, parallel, horizontal, external eighteen (18) inch bore headers, 19 and 20, one on either side of the pressure vessel 10, through a total of eighteen (18), six (6) inch bore connecting pipes 21 and 22.

The tube sheet 18 carries some one hundred and eighty-six (186) thin-walled (for example, about ⅛ inch) zirconium or zircalloy tubes 24 having a diameter of five (5) inches, which depend into the main chamber 16 of the pressure vessel 10. These tubes 24 are about twelve (12) feet long and they are closed at their lower ends and fitted with drain tubes 26 which communicate to the exterior of the vessel 10 by way of a common central outlet 28 in the lower end of the vessel 10.

Within each of the dependent tubes 24 is a coaxial inner stainless steel tube 30 open at its lower end to receive steam passing down the annulus between the tubes 24 and 30, and passing out of the upper end of the vessel 10. The inner tubes 30 are arranged to contain the fuel elements (not shown) and have refuelling ports 32 at their upper ends through which fuel can be charged and spent elements withdrawn. Each inner tube 30 has a flexible steam offtake 34 of about 2 inch bore connected to one of two parallel headers 36 and 38 arranged above the inlet headers 19 and 20, respectively.

The lower end of the vessel 10 is pierced by forty-nine (49) tubes, one of which is shown at 40, by which the heavy water moderator can be supplied to or withdrawn from one hundred and forty seven (147) vertical control tubes, of which three are shown at 42 of some five (5) inches bore. The control tubes 42 are connected to the supply tubes 40 by short triple manifolds 44.

The heavy water is maintained at the saturation temperature (500° F. at the quoted pressure) by cooling in an external heat exchanger 54 and a four (4) inch inlet connection 46 is provided in the lower end of the vessel 10 and a similar outlet connection 48 some twelve (12) inches below the tube sheet 18. Pump 52 provides the means for circulation.

The side and lower walls of the vessel 10 are provided with the usual axial thermal shielding, indicated as cylindrical wall 50 in section to minimize neutron damage to the walls.

The whole apparatus is fabricated by welding techniques.

If the moderator and the coolant are of the same kind of water, that is if heavy steam is used with heavy water moderator or light steam is used with light water moderator it is possible to simplify a reactor in accordance with the invention intended for land use by eliminating the tube sheet 18 and maintaining the water moderator at a level below the saturated steam inlets to the outer coolant tubes 24. In this arrangement no separate heat removal system need be provided for the moderation, boiling of which merely produces steam which can join the main coolant stream. The control of such a reactor can be effected by varying the level of the entire moderator and the individual control tubes 42 shown in the drawing are unnecessary.

This variation may be further modified by using some of the fuel elements as direct boiling fuel elements fed with moderator water by natural or forced circulation at the lower ends of the tubes 24 and discharging a steam/water mixture at their upper ends to conventional steam/water separators from which steam is liberated into the steam space above the moderator to mingle with or even to comprise the coolant steam, and separated water is returned to the body of the moderator. In such an arrangement, make-up feed water must be supplied to the moderator to compensate for this generated steam.

Towards maintaining the moderator in the main chamber 16 of the vessel at substantially the same temperature and pressure as the inlet steam, temperature controller (TC) and pressure controller (PC) responsive to the temperature and pressure in the main chamber 16 and plenum chamber 14 control rate of circulation of moderator via pump 52 and flow of cooling steam via valve 56, the latter in line 58 leading to headers 19 and 20.

What is claimed is:

A heterogeneous nuclear power reactor comprising
a pressure vessel,
a horizontal tube sheet disposed across said vessel at the upper end thereof dividing the vessel into an upper plenum chamber and a lower main chamber, the lower main chamber containing a body of moderator,
a plurality of spaced apart coaxial tube pairs suspended in said vessel and in said body of moderator, the tubes of said tube pairs being spaced from each other to define an annulus surrounding the inner tube thereof, the outer tube of said tube pairs being carried on and depending from the horizontal tube sheet and extending into the main chamber in fluid communication therewith, the inner tube of said tube pairs passing through said plenum chamber through the upper end of the pressure vessel and being suspended from the pressure vessel,
means for admitting a cooling fluid into said plenum chamber whereby the cooling fluid flows through the annuli of the tube pairs, the inner tubes of said pairs containing fuel elements and being open at the lower end thereof and in fluid communication with the annuli to receive the cooling fluid,
and means for maintaining the moderator at a pressure and temperature substantially equal to that of the cooling fluid entering the plenum chamber.

References Cited by the Examiner
UNITED STATES PATENTS

| | | | |
|---|---|---|---|
| 2,877,171 | 3/59 | Burton et al. | 176—64 |
| 2,938,845 | 5/60 | Treshow | 176—54 |
| 2,982,712 | 5/61 | Heckman | 176—20 |
| 3,049,487 | 8/62 | Harrer et al. | 176—54 |
| 3,071,527 | 1/63 | Young | 176—52 |
| 3,085,959 | 4/63 | Germer | 176—59 |
| 3,093,565 | 6/63 | Blockley et al. | 176—59 |

FOREIGN PATENTS

| | | |
|---|---|---|
| 1,044,296 | 11/58 | Germany. |
| 1,051,425 | 2/59 | Germany. |
| 822,220 | 10/59 | Great Britain. |

CARL D. QUARFORTH, *Primary Examiner.*

ROGER L. CAMPBELL, REUBEN EPSTEIN,
*Examiners.*